(12) United States Patent
Shirai et al.

(10) Patent No.: US 6,643,085 B2
(45) Date of Patent: *Nov. 4, 2003

(54) DATA PROCESSING APPARATUS AND ACCESS CONTROL METHOD

(75) Inventors: Katsumi Shirai, Yokohama (JP); Ichiro Anzai, Kawasaki (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/444,492

(22) Filed: Nov. 19, 1999

(65) Prior Publication Data

US 2003/0169660 A1 Sep. 11, 2003

(30) Foreign Application Priority Data

Mar. 30, 1999 (JP) ............................................ 11-089980

(51) Int. Cl.[7] ................................................. G11B 19/04
(52) U.S. Cl. ..................... 360/60; 369/53.21; 369/53.24
(58) Field of Search .................. 360/60, 48; 369/53.21, 369/53.24, 47.13

(56) References Cited

U.S. PATENT DOCUMENTS

| | | | | |
|---|---|---|---|---|
| 5,293,422 A | * | 3/1994 | Loiacono | 380/4 |
| 5,644,444 A | | 7/1997 | Braithwaite et al. | 360/60 |
| 5,896,454 A | * | 4/1999 | Cookson et al. | 360/60 |
| 6,012,143 A | * | 1/2000 | Tanaka | 713/200 |
| 6,018,788 A | * | 1/2000 | Ichikawa | 711/113 |
| 6,052,242 A | * | 4/2000 | Hirata | 360/15 |
| 6,192,424 B1 | * | 2/2001 | Chiang | 710/35 |

FOREIGN PATENT DOCUMENTS

| | | |
|---|---|---|
| JP | 1243150 | 9/1989 |
| JP | 6259938 | 9/1994 |
| JP | 8055022 | 2/1996 |
| JP | 8147767 | 6/1996 |
| JP | 9134259 | 5/1997 |
| JP | 9134311 | 5/1997 |
| JP | 9134330 | 5/1997 |
| JP | 9198778 | 7/1997 |

* cited by examiner

*Primary Examiner*—David Hudspeth
*Assistant Examiner*—Dan I. Davidson
(74) *Attorney, Agent, or Firm*—Greer, Burns & Crain, Ltd.

(57) ABSTRACT

An accessible count information which is the number of accessible times for recording medium is recorded on an additional recording dedicated area in the recording medium. Each time the recording medium is accessed, the accessible count information is subtracted and the value of remaining accessible count information is recorded in a non-recorded portion of the dedicated area. In this case, the access to the recording medium is controlled based on the minimum value of the accessible count information recorded in the dedicated area.

18 Claims, 6 Drawing Sheets

FIG. 2

| | Zone | Radius(mm) | Track No. |
|---|---|---|---|
| Medium Information Management Area | Lead-in Zone | | |
| | Initial Zone | 22.60~23.14 | |
| | Acquire Zone | | |
| | Lead-in tracks | 23.14~23.60 | -434~-93 |
| | Focus tracks | 23.60~23.61 | -88~-85 |
| | Inner Test Zone | | |
| | for manufacturers | 23.61~23.65 | -84~-53 |
| | for drives | 23.65~23.70 | -52~-21 |
| | Inner Control Zone | 23.70~23.72 | -20~-5 |
| | Buffer Zone | 23.72~23.72 | -4~-1 |
| Data Area | Data Zone | 23.72~41.00 | 0~18479 |
| Medium Information Management Area | Outer Test Zone | | |
| | for manufacturers | 41.00~41.02 | 18480~18511 |
| | for drives | 41.02~41.06 | 18512~18543 |
| | Buffer Zone | 41.06~41.28 | 18544~18854 |

FIG. 3A

| User ID | Password | Accessible Area Information | Accessible Count Information ||||||||||
|---|---|---|---|---|---|---|---|---|---|---|---|
| | | | 10 | 9 | 8 | | | | | | |

Non-recorded Area

FIG. 3B

| User ID | Password | Accessible Area Information | Accessible Count Information | Accessed Count Information ||||||||
|---|---|---|---|---|---|---|---|---|---|---|---|
| | | | | 1 | 2 | 3 | | | | | |

Non-recorded Area

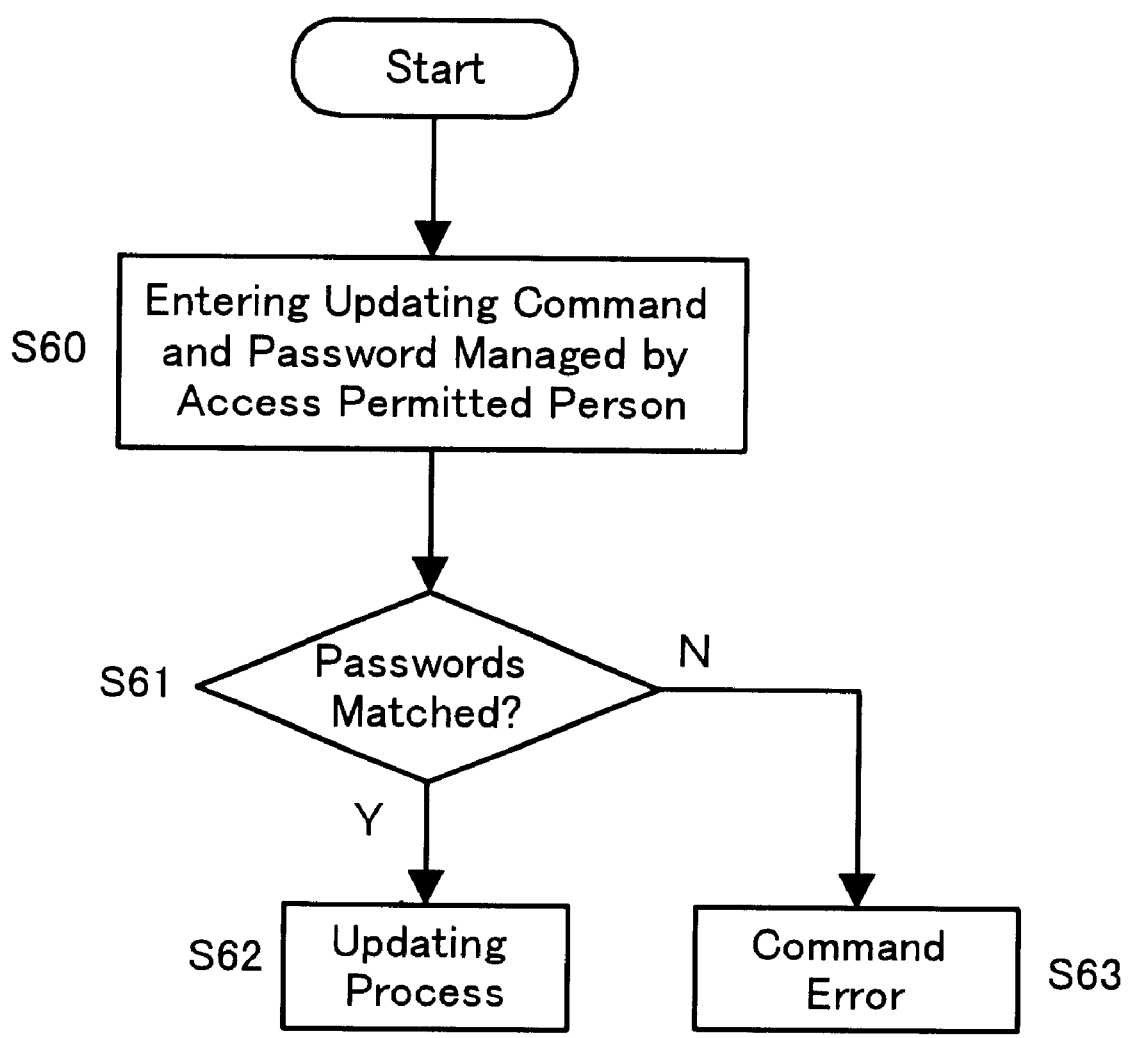

DATA PROCESSING APPARATUS AND ACCESS CONTROL METHOD

BACKGROUND OF THE INVENTION

1. Field of the Invention

The present invention relates to a data processing apparatus for accessing a recording medium and reading and writing data thereon, and in particular to a data processing apparatus for accessing the recording medium based on access control information.

2. Related Arts

A recording medium having a large memory capacity, such as an optical disk or a magneto-optical disk, is an appropriate medium for recording data, such as image information for films and music information, which are copyright protected. When the use of data recorded on a recording medium is permitted, the access permission conditions, such as the limitations of accessible range of data and/or the number of accessible times to data, can be set.

These access permission conditions are recorded as access control information in a predetermined area on a recording medium, for example. A data processing apparatus reads the access control information and accesses data based on that information. To prevent such access control information from being rewritten freely, the information can be accessed only when, for example, a password which is input from an upper level apparatus, connected to a data processing apparatus, matches a password included in the access control information.

However, if the password is decoded by specific means, the access control information itself can be accessed and can be illegally rewritten. To prevent this from occurring, therefore, the predetermined area where the access control information is recorded may be set as a non-rewritable area. However, the following problem is encountered at this case. That is, in case that accessible times for limiting the number of times of access to a predetermined data area is established as the access control information, the accessible times can not be updated. Specifically, since accessed times must be counted each access to the data area and, the number of the remaining accessible times must be updated. However, in case that the predetermined area for the access control information has been set as the non-rewritable area, the updating process can not be performed. Therefore, a demand exists for ensuring the security of access control information which must be updated.

SUMMARY OF THE INVENTION

It is one objective of the present invention to provide a data processing apparatus for ensuring the security of access control information which needs to be updated, and an access control method therefor.

To achieve the above objective, according to the present invention, there is provided a data processing apparatus for accessing a recording medium for reading and writing of data comprising:

a setting unit for setting a predetermined area on said recording medium as a dedicated area for additional recording, in which the updating of recorded data is inhibited but in which the writing of data in a non-recorded portion is permitted;

a recording unit for recording access control information in said dedicated area; and an access controller for controlling access to said recording medium based on said access control information recorded in said dedicated area.

Thus, since the updating process which is required for the access control information recorded in the access control area can be performed, and since the illegal rewriting of the access control information can be prevented, ensured security is provided for the access information.

For example, in case that the access control information includes accessible count information which is the number of accessible times for recording medium, each time the recording medium is accessed, the access controller subtracts the accessible count information and the recording unit records the value of remaining accessible count information in the non-recorded portion of the dedicated area. In this case, the access controller controls the access to the recording medium based on the minimum value of the accessible count information recorded in the dedicated area. The recording unit may record accessed count information which is the number of accessed times in the non-recorded portion of the dedicated area, the accessed count information is added each time the access controller accesses the recording medium. In this case, the access controller controls the access to the recording medium based on the maximum value of the accessed count information recorded in the dedicated area.

When a plurality of data are recorded in a data area on the recording medium, the access control information is established for at least one data which is accessible in the data area of the recording medium. Thus, the access control information is established for a part of the data area.

Furthermore, it is preferable byte units be employed for the recording the access control information in the predetermined area by the recording unit, and that likewise the access controller read the access control information by the byte units. Therefore, compared with the recording of data by sector units, each of which is normally composed of several hundred bytes, a comparatively small amount of access control information can be efficiently recorded in the access control area.

Further, to achieve the above objective, there is provided a access control method for accessing a recording medium for reading and writing of data comprising the steps of:

recording access control information in a dedicated area for additional recording on said recording medium, in which the updating of recorded data is inhibited but in which the writing of data in a non-recorded portion is permitted; and controlling access to said recording medium based on said access control information recorded in said dedicated area.

BRIEF DESCRIPTION OF THE DRAWINGS

FIG. 2 is a diagram showing an example layout of a disk format for a magneto-optical disk (MO);

FIGS. 3A and 3B are specific diagrams showing access control information recorded in an access control area;

FIG. 6 is a flowchart showing the processing performed to update the access control information.

DETAILED DESCRIPTION OF THE PREFERRED EMBODIMENT

The preferred embodiment of the present invention will now be described while referring to the accompanying drawings. It should be noted, however, that the technical scope of the present invention is not limited to this embodiment.

Figure 1:
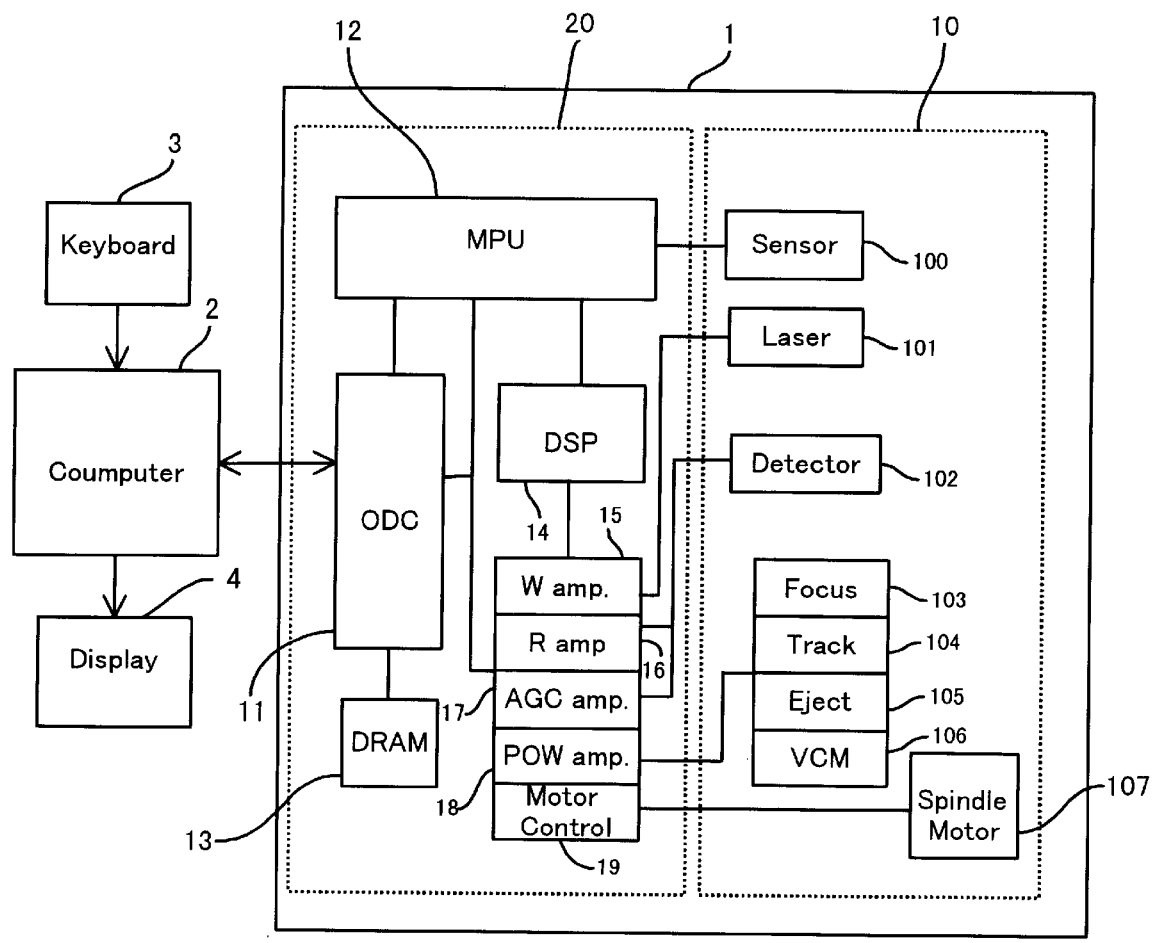
FIG. 1 is a schematic block diagram illustrating a magneto-optical disk device which is a storage device according to one embodiment of the present invention.

FIG. 1 is a schematic block diagram illustrating a magneto-optical disk device, which is a data processing apparatus according to the embodiment of the present invention. In this embodiment, a magneto-optical disk (MO) is employed as a data recording medium. However, the recording medium is not limited to a magneto-optical disk, and may be another data rewritable recording medium, such as a magnetic disk, a floppy disk, an optical disk or a phase-change type optical disk.

In FIG. 1, a magneto-optical disk device 1 is connected through a SCSI interface to a computer (e.g., a personal computer) 2 which constitutes an upper level apparatus. Incorporated in the computer 2 is a driver for the magneto-optical disk device 1 of this invention. The magneto-optical disk device 1 comprises a mechanism unit 10 for writing and reading data relative to a magneto-optical disk, and a control unit 20 for controlling the operation of the mechanism unit 10. The control unit 20 includes an optical disk controller (hereinafter referred to simply as an ODC) 11 in which is recorded firmware consisting of the software which is required to carry out the access control method of this invention. The access control method of the present invention, which will be described later, is controlled by the ODC 11.

The control unit 20 further includes an MPU 12, for controlling the overall operation of the magneto-optical disk device 1; a DRAM 13, which is a buffer memory for reading and writing; a digital signal processor (DSP) 14, for providing positioning control; a write data amplifier 15; a read data amplifier 16; an AGC amplifier 17; a head drive power amplifier 18; and a disk rotation motor controller 19.

The mechanism unit 10 includes a head sensor 100; a data reading/writing laser diode 101; and a detector 102 for detecting the inclination of a head. The mechanism unit 10 further includes a focus actuator 103, a track actuator 104, a disk ejection motor 105 and a head drive voice coil motor (VCM) 106, all of which are controlled by the head drive power amplifier 18; and a spindle motor 107, for rotating a disk, which is controlled by the motor controller 19.

The computer 2, to which is connected a display 4 for displaying data, upon receiving a command entered by a user at a keyboard 3 for the writing/reading of data, transmits the command to the optical disk controller (ODC) 11.

Included in the ODC 11 is a flash ROM in which is recorded firmware which has as one function the analyzation of commands received from the computer 2. The ODC 11 also interacts with the MPU 12 to permit the mechanism unit 10 to write/read data.

FIG. 2 is a diagram showing an example disk format layout for a magneto-optical disk (MO), i.e., the portion of an MO disk which conforms to the ISO standards for a 3.5-inch magneto-optical disk cartridge. As is shown in FIG. 2, the portion lying within an area delimited by a radius of 23.72 mm and a radius of 41.00 mm measured from the center of the MO disk is a data area. The outer and inner areas in the radial direction are medium information management areas in which data are recorded concerning various medium information types, such as a medium type and its structure. In this embodiment, an access control area for storing access control information is provided in a predetermined area in the data area or in the medium management area. Specifically, the access control area is provided in an region, such as a buffer zone in the medium information management area, which the ODC 11 does not access in response to a general command from the computer 2.

Further, in this embodiment, the access control area is designated as an additional recording dedicated area. That is, the additional recording dedicated area is an area wherein data writing in a data-recorded area is inhibited but is permitted to a non-recorded area. The non-recorded area is, for example, an area in which any data has not yet been written.

FIGS. 3A and 3B are specific diagrams showing access control information recorded in the access control area. In FIG. 3A, the access control information includes a user ID, a password, accessible area information and accessible count information. The user ID is identification information used to identify a user who is permitted to access data in the data area.

A password is a code number which generally only a user knows. The accessible area information is address information for an area in the data area which a user is permitted to access. The accessible area may be either the entire data area, or one or a plurality of portions of the data area. The accessible count is the number of accessible time to the accessible area. At the beginning, the initial value (e.g., 10) is set as the accessible count. Thereafter, each time the accessible area is accessed the initial value is decreased by a predetermined value (e.g., 1), and the remaining accessible count is written in the non-recorded area, which will be described later. In the following explanation, the user ID, the password and the accessible area information are collectively called access permission information.

Another example for the access control information is shown in FIG. 3B. This access control information includes the accessible count information, which is set initially and is not decreased, and an accessed count information, instead of decreasing accessible count information whose initial value is subtracted for each access. The accessed count is the number of actually accessed times to the accessible area. For the accessed count information, the initial value (e.g., 1) is added by a predetermined value (e.g., 1) each time the accessible area is accessed, and the resultant value is recorded in a non-recorded area.

In this embodiment, since the access control area is established as the additional recording dedicated area, in the access control information that has already been recorded the rewriting of the access permission information is inhibited. Furthermore, since a non-recorded area is provided for the recording of the accessible count information, which is decreased each time data is accessed, the accessible count information can be updated.

Therefore, the data processing apparatus of the present invention can prevent the illegal rewriting of the access control information by accessing the access control area to expand the accessible area without permission, or to increase the number of available accesses.

Generally, the data area and the medium information management areas of the magneto-optical disk are divided into sectors, each of which comprise a predetermined number of bytes, such as 512 bytes or 1024 bytes, and in the data area sector units are employed for the recording of data. However, in this embodiment, the access control area is divided into byte units, and byte units are employed for the recording of access control information. This is because the accessible count information which is additionally recorded for each access uses only several bytes, and it is not efficient to assign such a small amount of data to a sector having a larger data capacity. And further, since the amount of access permission information (the user ID, the password and the accessible area information) is considerably smaller than the amount of data corresponding to the sector, it is also not efficient to assign the access permission information to the sector. As is described above, since the access control information is recorded by the byte units in the access control area, the access control area can be efficiently employed.

Therefore, to acquire access control information the ODC 11 reads byte units from the access control area, whereas it reads by sector units from the other areas as general way.

The access control processing for the embodiment of the present invention will be described in further detail while referring to FIGS. 4 to 6. The access control processing in FIGS. 4 to 6 is performed by the ODC 11 in FIG. 1 in accordance with a command received from the computer 2 in FIG. 1, in which is installed a driver corresponding to the data processing apparatus of the present invention.

Figure 4:
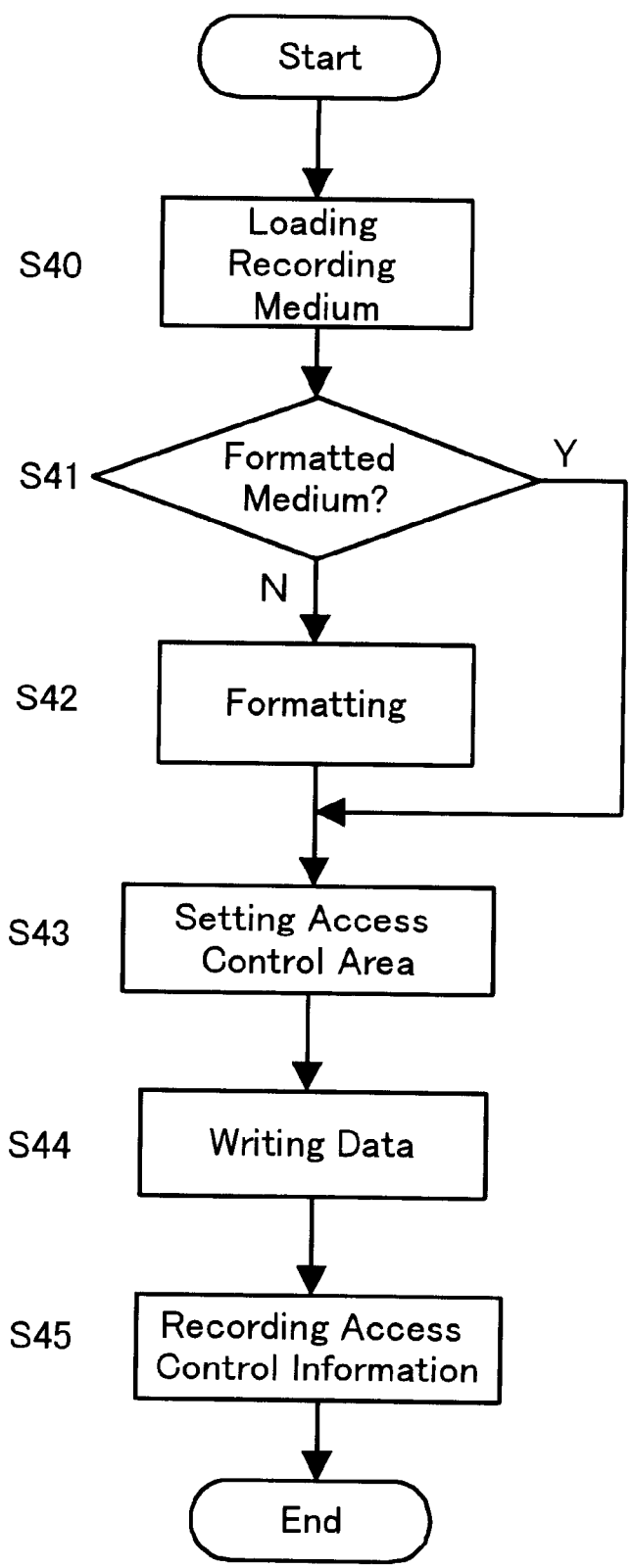
FIG. 4 is a flowchart showing the processing performed to establish an access control area.
Figure 5:
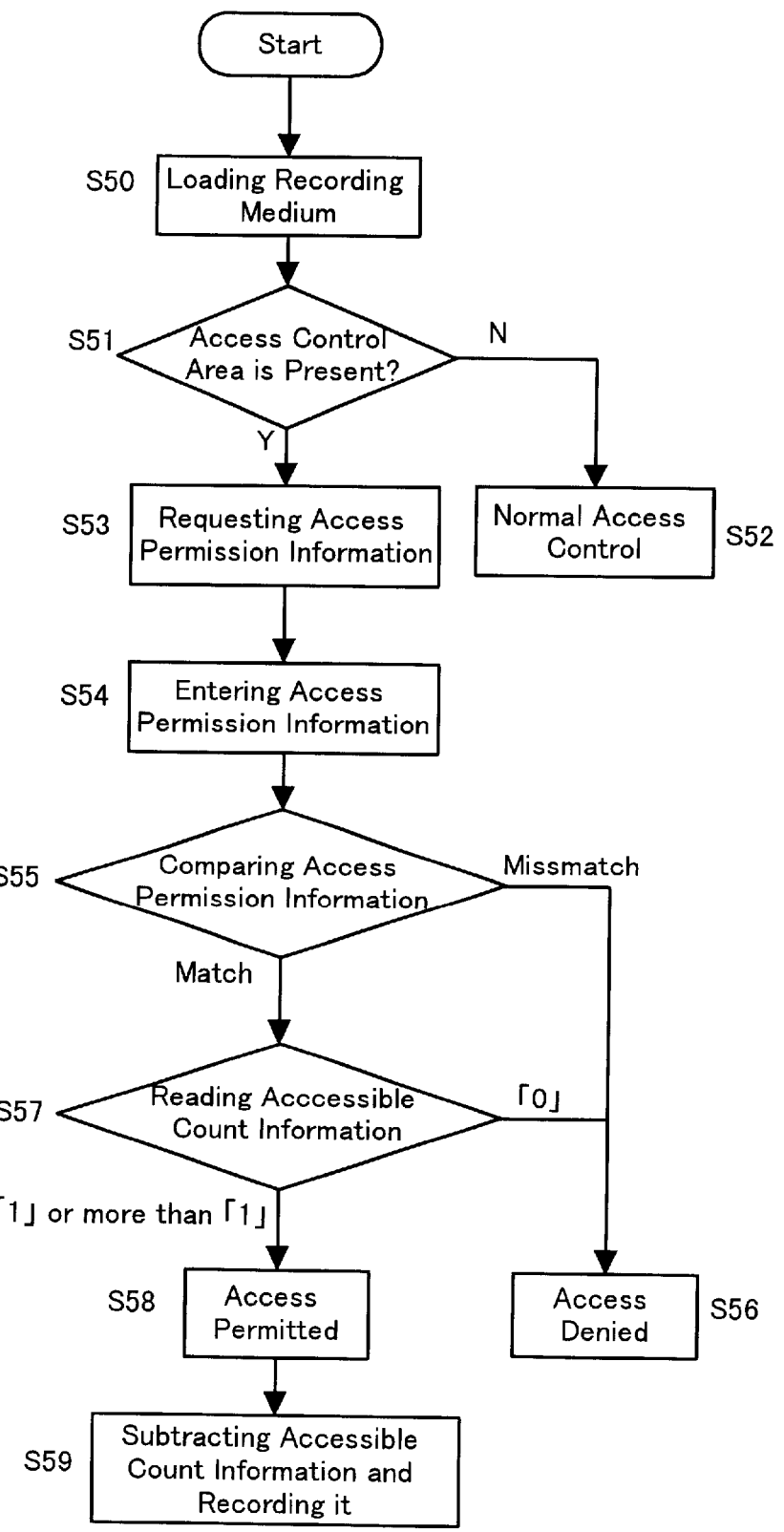
FIG. 5 is a flowchart showing the access control processing performed for a recording medium whereon access control information is recorded in the access control area.

FIG. 4 is a flowchart showing the processing for setting the access control area. At step S40, a new, unused recording medium conforming to the standards (ISO standards) is loaded into the data processing apparatus. At step S41, the ODC 11 determines whether the loaded recording medium is normally formatted. If the recording medium is not formatted, at step S42 a common formatting process is performed.

At step S43, the ODC 11 sets an access control area dedicated for additional recording to a predetermined area of the recording medium. Hereinafter the recording medium for which the access control area which is dedicated for additional recording is established is called a secure medium. At step S44, data are written in the data area of the secure medium. Since the ODC 11 of the data processing apparatus of the present invention stores a predetermined encoding program, this program is used to encode the data recorded in the data area. Furthermore, since a decoding program is recorded in the ODC 11, when access to the data area is permitted, which will be described later, the ODC 11 decodes encoded data and reads the resultant data. Therefore, even when a common data processing apparatus other than that of the present invention accesses the secure medium, it will not be able to decode the encoded data nor will it be able to access and read data. As a result, the security of the data is ensured.

At step S45, in accordance with a predetermined command received from the computer 2, the ODC 11 records the access control information in the access control area. That is, the ODC 11 records the user ID of a user, who has obtained from an owner (e.g., a copyright owner; hereinafter referred to as an access permitted person) the right to access data in the data area, the password, the accessible area information corresponding to the address information for the data to be accessed, and the initial value for the accessible count information.

FIG. 5 is a flowchart showing the access control processing for a recording medium for which the access control information corresponding to FIG. 3A has been recorded in the access control area. At step S50, a recording medium is loaded into the data processing apparatus. At step S51, in order to identify the loaded recording medium and to decide whether it is a common recording medium or the secure medium on which the access control area has been set, the ODC 11 accesses a predetermined area of the recording medium to determine whether an access control area is present. If the loaded recording medium determined to be the common recording medium, at step S52 normal access of the data area is started. In other words, data is read from the data area in accordance with an access command received from the computer 2.

When the loaded recording medium is determined to be the secure medium, at step S53 the ODC 11 requests the access permission information to the upper level apparatus, which includes the user ID, the password and address information of data to be accessed. When, at step S54, the access permission information is entered at the keyboard 3 of the computer 2 which is the upper level apparatus, at step S55 the ODC 11 compares the entered access permission information with the access permission information (the user ID, the password and the accessible area information) recorded in the access control area. When the information does not match, the ODC 11 refuses to access the requested data (step S56). When the address information for the requested data does not match the address information in the accessible area information, even though the user ID and the password match, the ODC 11 also denies access to the requested data. The address information of the requested data in the entered access permission information can be included in the accessible area information for the access permission information which is recorded in the access control area of the recording medium.

When the entered access permission information matches that recorded in the recording medium, at step S57 the ODC 11 reads the accessible count information from the access control area. At least one value has been written for the accessible count information in the access control area. When the access of data was previously permitted, the decreased accessible count is also recorded, so that a plurality of values are sequentially recorded. Therefore, from among the values which are read, the ODC 11 determines that the smallest (minimum) value is the latest accessible count information.

When at step S57 the accessible count is equal to or greater than "1" at step S58 access of the requested data is permitted. In other words, the ODC 11 decodes the encoded data and reads the result. At step S59, the ODC 11 subtracts "1" from the smallest accessible count, and records the resultant value in the non-recorded area as accessible count information. If, at step S57, the accessible count is "0", the requested data access is refused (step S56).

When the accessible count is subtracted by "1" each time data is accessed and finally reaches "0", even when all the access permission information matches, the next access request is denied because exceeding the accessible count is not permitted.

The accessible count information is not limited to a value corresponding to the number of accessible times, and also the subtract or decrease value is not limited to "I". For example, while the accessible count is "10", in the accessible count information the value "20" may be set and for each access it may be decreased by "2".

When the access control information in FIG. 3B has been set, at step S57 the accessible count information and the accessed count information are read. Then, when the maximum value read from the actual access count information is smaller than the accessible count, access is permitted. At step S59, the maximum value is added by one, and the resultant value is recorded in a non-recorded area provided for the recording of the number of accessed times.

Further, the accessible count (in case of FIG. 3A), or accessed count (in case of FIG. 3B), can be recorded in the access control area, together with information for identifying the updating order (updating order identification information, such as dates), and in accordance with the updating order identification information, the latest accessible count or the latest access count may be read at step S57.

As is described above, since the access control area dedicated to additional recording is set by the data processing apparatus of the present invention, the updating process can be performed which is required for the access control information recorded in the access control area, and the illegal rewriting to the access control information can be inhibited. As a result, the security of the access control information is ensured. Therefore, the illegal rewriting to the access control information to enable the accessing of data for which access is not permitted, or to enable the accessing of data exceeding the accessible count can be prevented. Thus, protection of data covered by the copyright results in protection of the right of the access permitted person.

Furthermore, in order to update the access control information recorded in the access control area, in the processing performed in FIG. 4, the access control area may be rendered rewritable by using the password managed by the access permitted person. Through the updating of the access control information, for example, an additional accessible area can be established, the accessible count can be changed, and a password can be changed.

FIG. 6 is a flowchart showing the processing for updating the access control information. In FIG. 6, at step S60 a predetermined updating command for rewriting the access control information, and the password is entered from the computer 2. The password managed by the access permitted person is recorded in advance in the memory of the ODC 11. When, at step S61, the entered password which is entered matches the password recorded in the ODC 11, rewriting of the access control area is enabled, and the access control information therein is updated in accordance with a predetermined update command received from an upper level apparatus (step S62). If at step S61 the two passwords do not match, a command error is issued (step S63).

In the above embodiment, an access level corresponding to data which are permitted to be accessed may be established as the access control information. For example, the access level may be established whereat only the reading of accessible data is permitted, and whereat both the reading and the writing of data are enabled.

In the above embodiment, the accessible count information is established as the access control information. Instead of this, accessible period information may be set to control access in accordance with the access permitted period, such as the number of days or a period of time. In this case, the data processing apparatus includes a timer, and the upper level apparatus employs software to control access in accordance with the period measured by the timer.

A plurality of passwords may be set in the access control area so that a plurality of users can employ a single recording medium. In this case, a password entered at the upper level apparatus need only match one of these passwords.

In the access control area, the areas for recording the user ID and the password may be rewritable areas. In this case, by using the password managed by the access permitted person, permission for the rewriting of the user ID can be obtained, as is shown in FIG. 6. The rewriting of the password is permitted when a password entered by a user at the upper level apparatus matches a password recorded in the access control information.

As is described above, according to the present invention, since the access control area dedicated for additional recording is established on a recording medium, the updating process for the access control information recorded in the access control area is enabled, and the illegal rewriting of the access control information is inhibited. Thus, the security of the access control information is ensured. Therefore, the illegal rewriting of access control information to enable the accessing of data for which access is not permitted, or to enable the accessible count to be exceeded is prevented. As a result, the protection of the data covered by the copyright results in the protection of the right of the access permitted person.

The present invention may be embodied in other specific forms without departing from the spirit or essential characteristics thereof. The present embodiment is therefore to be considered in all respects as illustrative and not restrictive, the scope of the invention being indicated by the appended claims rather than by foregoing description and all change which come within the meaning and range of equivalency of the claims are therefore intended to be embraced therein.

What is claimed is:

1. A data processing apparatus for accessing a recording medium for reading and writing of data comprising:

a setting unit for setting a predetermined area on said recording medium as a dedicated area for additional recording, in which the rewriting of recorded data is inhibited but in which the writing of data in a non-recorded portion is permitted;

a recording unit for recording initial information regarding the number of accessible times to said recording medium in said dedicated area, and count information regarding the number of access times to said recording medium in said non-recorded portion of said dedicated area each time accessing to said recording medium occurs; and an access controller for controlling access to said recording medium based on access control information including said initial information recorded in said dedicated area and said count information recorded in said non-recorded portion of said dedicated area.

2. The data processing apparatus according to claim 1, wherein the count information is decreased each time said recording medium is accessed by said access controller.

3. The data processing apparatus according to claim 2, wherein said access controller controls the access of said recording medium in accordance with the minimum value of the count information recorded in said dedicated area.

4. The data processing apparatus according to claim 1, wherein the count information is increased each time said recording medium is accessed by said access controller.

5. The data processing apparatus according to claim 4, wherein said access controller controls the access to said recording medium in accordance with the maximum value of the accessed count information recorded in said dedicated area.

6. The data processing apparatus according to claim 1, wherein said access control information is established for at least one accessible data in a data area on said recording medium.

7. The data processing apparatus according to claim 1, wherein said recording unit records in said predetermined area said access control information by byte units, and wherein said access controller reads said access control information in said predetermined area by the byte units.

8. The data processing apparatus according to claim 7, wherein said recording unit records data in an area other than said predetermined area by sector units composed of a plurality of bytes, and wherein said access controller reads data in an area other than said predetermined area by the sector units.

9. The data processing apparatus according to claim 1, wherein said recording medium is a rewritable recording medium, such as an optical disk, a magnetic disk, a magneto-optical disk or a phase-change type disk.

10. An access control method for accessing a recording medium for reading and writing of data comprising the steps of:

recording an initial information regarding the number of accessible times to said recording medium in a dedicated area for additional recording on said recording medium, in which the rewriting of recorded data is inhibited but in which the writing of data in a non-recorded portion is permitted, and a count information regarding the number of access times to said recording medium in said non-recorded portion of said dedicated area each time accessing to said recording medium; and controlling access to said recording medium based on access control information including said initial information recorded in said dedicated area and said count information recorded in said non-recorded portion of said dedicated area.

11. The data processing method according to claim 10, wherein the count information is decreased each time said recording medium is accessed.

12. The access control method according to claim 11, wherein the access of said recording medium is controlled in accordance with the minimum value of the accessible count information recorded in said dedicated area.

13. The access control method according to claim 10, wherein accessed count information which is the number of the accessed times is recorded in the non-recorded portion of said dedicated area, the accessed count information being added each time said recording medium is accessed.

14. The access control method according to claim 13, wherein the access to said recording medium is controlled in accordance with the maximum value of the accessed count information recorded in said dedicated area.

15. The access control method according to claim 10, wherein said access control information is established for at least one accessible data in a data area on said recording medium.

16. The access control method according to claim 10, wherein said access control information is recorded by byte units in said dedicated area, and said access control information in said dedicated area is read by the byte units.

17. The access control method according to claim 16, wherein data is recorded in an area other than said dedicated area by sector units composed of a plurality of bytes, and the data in the area other than said dedicated area is read by the sector units.

18. A recording medium comprising:

a data area; and an access control area in which access control information used for a controlling access to said data area is set, wherein said access control area is a dedicated area for additional recording, in which the rewriting of recorded data is inhibited but in which the writing of data in a non-recorded portion is permitted;

wherein said access control information includes an initial information and a count information, said initial information regarding the number of accessible times to said recording medium being recorded in said dedicated area, and said count information regarding the number of access times to said recording medium being recorded in said non-recorded portion of said dedicated area each time accessing to said recording medium.

\* \* \* \* \*

UNITED STATES PATENT AND TRADEMARK OFFICE
CERTIFICATE OF CORRECTION

PATENT NO. : 6,643,085 B2
DATED : November 4, 2003
INVENTOR(S) : Katsumi Shirai

It is certified that error appears in the above-identified patent and that said Letters Patent is hereby corrected as shown below:

Column 8,
Line 51, delete "accessed";

Column 9,
Line 22, delete "data processing" and insert -- access control -- therefor;
Line 27, delete "accessible";
Line 30, delete "accessed count information which is the number of the accessed times is recorded in the non-recorded portion of said dedicated area,";
Line 32, delete "accessed";
Line 32, delete "being added" and insert -- is increased -- therefor;

Column 10,
Line 1, delete "accessed";
Line 25, delete ";" (the semicolon) and insert -- and -- therefor.

Signed and Sealed this

Fifteenth Day of June, 2004

JON W. DUDAS
*Acting Director of the United States Patent and Trademark Office*